No. 626,822.  
Patented June 13, 1899.  
E. BASEMAN.  
GRAIN DRILL.  
(Application filed Jan. 13, 1899.)  
(No Model.)  
3 Sheets—Sheet 1.

Witnesses.  
Geo. Willard Rich  
Thomas Durant

Inventor.  
Ernest Baseman,  
by Church & Church  
his Attorneys.

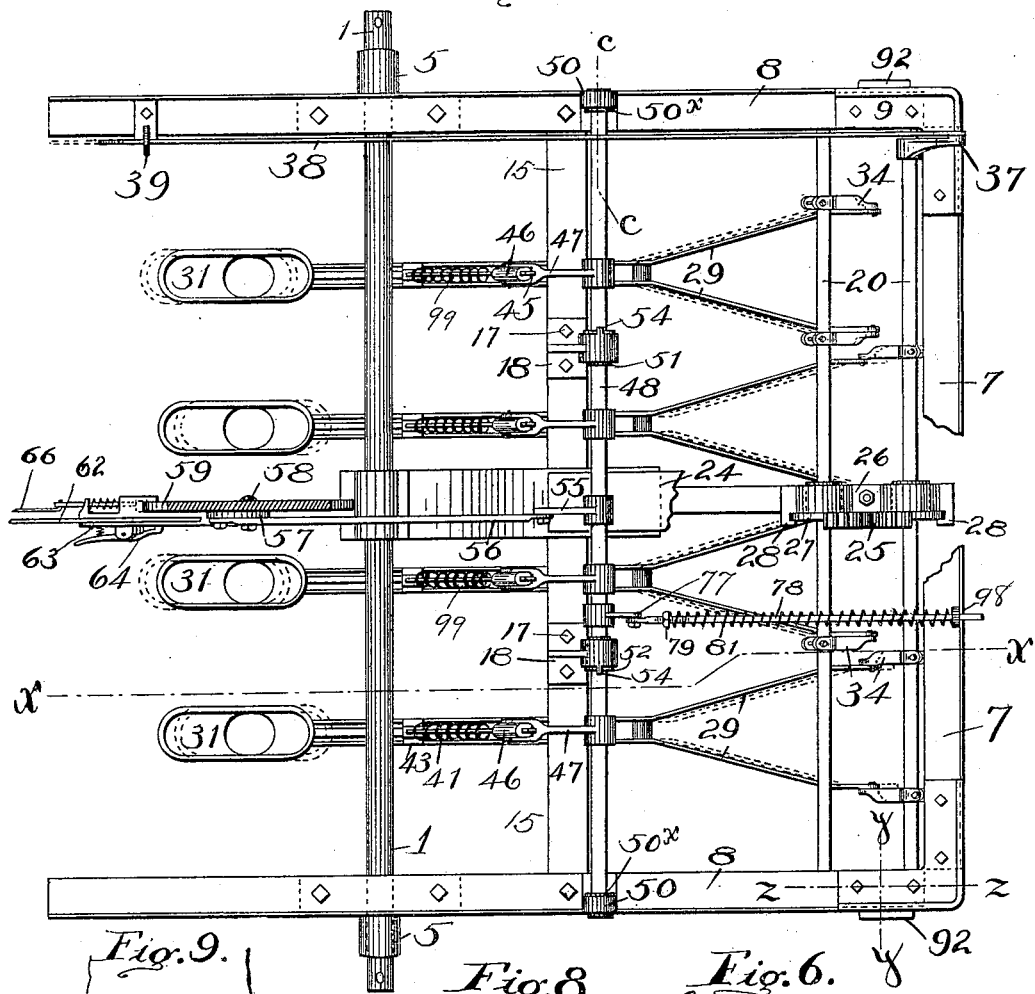

No. 626,822. Patented June 13, 1899.
E. BASEMAN.
GRAIN DRILL.
(Application filed Jan. 13, 1899.)
(No Model.) 3 Sheets—Sheet 3.
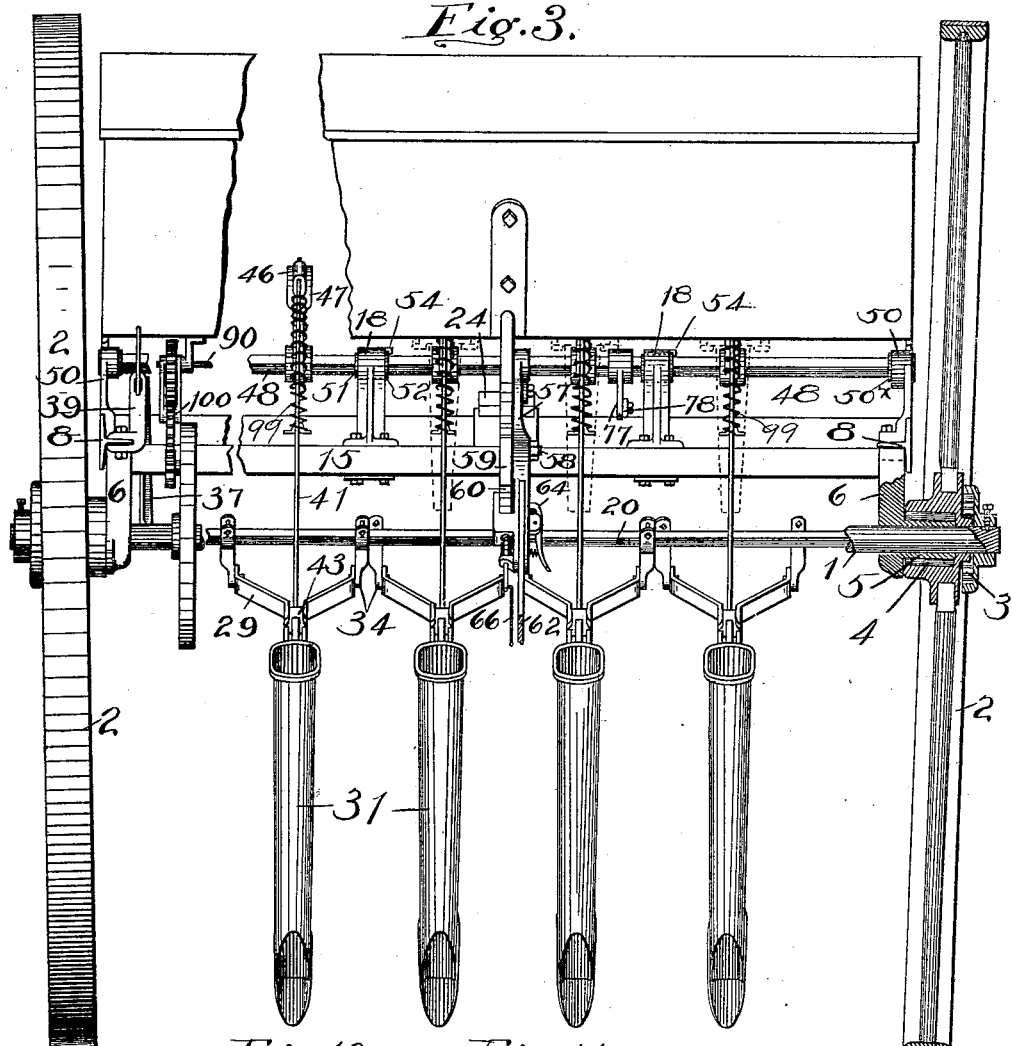
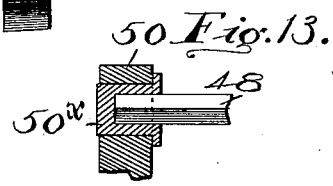
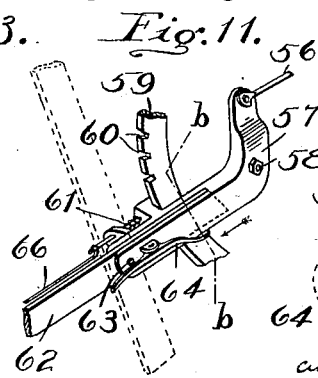
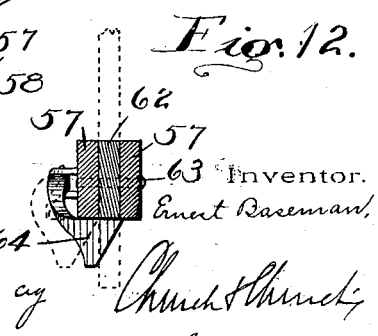
Witnesses.
Geo Willard Rich.
Thomas Durant
Inventor.
Ernest Baseman,
Church & Church
his Attorneys

UNITED STATES PATENT OFFICE.

ERNEST BASEMAN, OF MACEDON, NEW YORK, ASSIGNOR TO THE BICKFORD & HUFFMAN COMPANY, OF SAME PLACE.

GRAIN-DRILL.

SPECIFICATION forming part of Letters Patent No. 626,822, dated June 13, 1899.

Application filed January 13, 1899. Serial No. 702,088. (No model.)

*To all whom it may concern:*

Be it known that I, ERNEST BASEMAN, of Macedon, in the county of Wayne and State of New York, have invented certain new and useful Improvements in Grain-Drills; and I do hereby declare the following to be a full, clear, and exact description of the same, reference being had to the accompanying drawings, forming a part of this specification, and to the reference-numerals marked thereon.

My invention relates to improvements in agricultural implements, and particularly to seeding-machines or grain-drills; and it consists in certain improvements in the main frame and means for connecting and operating the hoes or drills, whereby the latter may be readily manipulated by the operator and held yieldingly in the ground; and it further consists in certain improvements in construction and combinations of parts, all as will be hereinafter fully described, and the novel features pointed out in the claims at the end of this specification.

Figure 1:
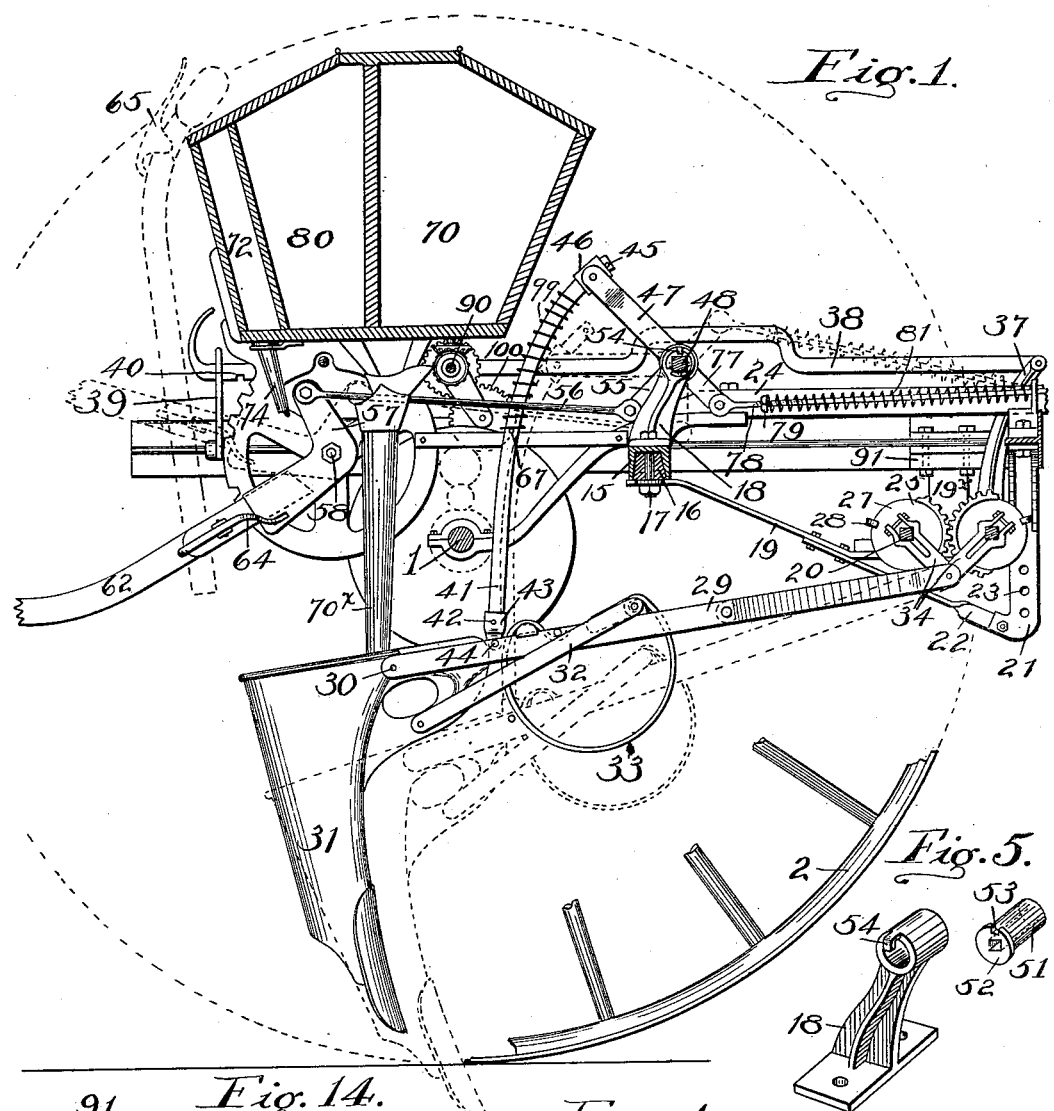
Figure 5:
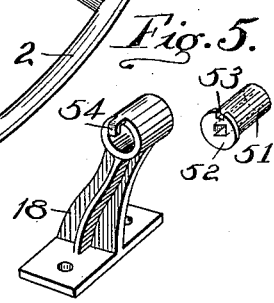
Figure 14:
Figure 4:
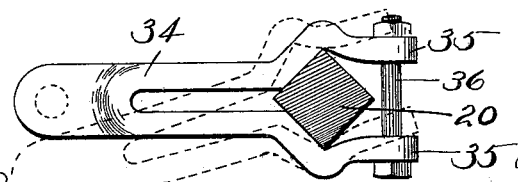

In the drawings, Figure 1 is a vertical sectional view taken on the line $x x$ of Fig. 2; Fig. 2, a plan view of the machine with the seed-hoppers, supporting-wheels, and feeding devices removed; Fig. 3, a rear elevation of the machine; Fig. 4, a detail sectional view showing the clip connecting the drag-bars with the drag-bar shafts; Fig. 5, a detail perspective view of the thimbles or sleeves on the shaft controlling the elevation of the hoes; Fig. 6, a sectional view taken on the line $y y$ of Fig. 2; Fig. 7, a sectional view on the line $z z$ of Fig. 2; Fig. 8, detail views of the corner-brackets of the main frame; Fig. 9, a rear view of the operation of the hopper, showing the adjustable grass-seed spout; Fig. 10, a sectional view on the line $a a$ of Fig. 9, looking downwardly; Fig. 11, a detail perspective view of the adjusting-lever; Fig. 12, a sectional view on the line $b b$ of Fig. 11, looking in the direction indicated by the arrow; Fig. 13, a sectional view on the line $c c$ of Fig. 2; Fig. 14, a view of a bearing-bracket.

Similar reference-numerals in the different figures indicate similar parts.

1 indicates the main axle of the machine, having the usual supporting-wheels 2 connected thereto by backing rachet mechanism of any approved style, (indicated by 3,) the apertures in the hubs of the wheels being cylindrical and operating upon rollers 4, arranged around sleeves 5, secured to or forming part of brackets 6, attached to the main frame of the machine and having the cylindrical exteriors. The main axle is arranged in substantially horizontal plane; but the exteriors of the sleeves 5 extend at a slight angle, as shown, to give the wheels the proper dish, thereby permitting the rollers to roll on smooth straight surfaces.

The main frame of the machine is composed of the front bar and the side bars 8, said bars being composed of angle-iron, with the central web, as shown particularly in Fig. 6, and in forming the frame the front and side bars are cut to the proper length and united at the corners by a pair of flanged connecting plates or brackets 9 10, constructed of angle-iron and having the triangular projections 11 at their outer corners rounded at the outer side, so as to fill up the space in the angle between the outer flange of the bars 7 and 8. One of each pair of these corner-brackets is also provided with the filling-block 12, of substantially the thickness of the internal web of the front and side bars, as shown particularly in Figs. 7 and 8, so that when said brackets are clamped in position by the bolts 13 the exterior of the corners of the main frame are substantially smooth and the parts are held rigidly together. The brackets 9 and 10 are provided with flanges 14, extending above and below the outer sides or flanges of the frame-bars 7 and 8, as shown.

It is preferred that the main frame should be open at the back, as usual, for the accommodation of the movable parts and to permit their ready adjustment. Secured to the sides of the main frame and extending laterally thereof is a cross bar or beam 15, composed of channel-iron or steel, the recess in the under side of said cross-bar being provided with a filling-piece 16, of wood or similar more or less compressible material, through which and the upper portion of the cross-bar are passed bolts 17, rigidly securing to said bar brackets 18, in which a rock-shaft for raising and lowering the hoes is mounted, as will be presently described. Also secured to the under side of the cross-beam 15 is the forwardly and downwardly extending brace 19, carrying the central bearings of the drag-shafts 20, the forward end of said brace 19 being secured to a bracket 21, bolted to the front bar 7 and extending downward, the lower end being connected by a bar 22 with the central brace 19, and said bracket 21 is provided with a series of apertures 23 for the reception of the adjustable clevis to which the whiffletree is connected.

24 indicates the tongue or pole of the machine, connected to the cross-bar 15 and also to the center of the front bar 7.

The employment of the channel-bar 15 in connection with the filling-piece 16, of wood, through which the bolts pass, forms a more or less elastic connection with the bolts 17 and prevents the nuts on the latter from coming loose and also serves to stiffen somewhat the cross-bar and enables the latter to be constructed of lighter material.

The drag-bar rock-shafts 20 are angular in cross-section, their ends being supported in thimbles similar to thimbles $50^\times$, having angular interior apertures to fit on the shafts and smooth exteriors to rotate in suitable bearings in brackets $19^\times$, (see Fig. 14,) secured to the side bars of the frame, and at the center of the machine there are arranged upon these rock-shafts intermeshing segment-gears 25, provided with sleeves having angular apertures to fit the shafts and cylindrical exteriors and held in position by the upper bearing-plates 26, as shown in Fig. 2. The ends of these gears are provided with flanges 27, with which coöperate fingers 28 on the bearing-plate 26, serving to prevent the longitudinal movement of the gears on the shaft and in the bearing. The employment of sleeves with angular interior apertures enables the angular shafts to be used without fitting, other than cutting them into proper lengths, and enables me to use sleeves and gears of cast metal, which are readily secured in position at a nominal expense.

29 indicates the drag-bars, bifurcated at their forward ends, as usual, pivoted at 30 to the hoes or drills 31, the lower portion of said drills being pivotally connected to links 32, attached to the usual springs 33, enabling the hoes or drills to yield rearwardly when encountering an obstruction. The drag-bars are connected to shafts 20 by clips 34, pivoted to their forward ends and having the arms 35 at their forward ends connected by bolts 36, the space between the extreme forward portions of these arms 35 being but a trifle less than the diameter of the shafts 20, and their proximate faces are shaped, as shown particularly in Fig. 4, so as to bear on two of the flat sides of the shafts, in which position they are secured by tightening the bolt. When the bolts are loosened, the shafts may be rotated in the clips, or vice versa, until the flat surfaces extend substantially in planes parallel with those of said clips, and as the arms 35 will yield or spring slightly the clips may be readily removed from the shafts. This manner of connection is particularly advantageous, as the clips may be formed of malleable castings, and by reason of the length of the arms the latter will yield sufficiently to enable the shaft and clips to be relatively turned and free the bearing-surfaces, and the clips may then be removed laterally of the shaft. Upon one of the drag-bar rock-shafts 20 is provided the arm 37, to which is pivoted an adjustable rod 38, extending to the rear of the machine and passing through the perforated plate 39, adapted to coöperate with notches 40 in the rod, so that the hoes or drills may be readily staggered from the rear of the machine when desired.

The means for raising and lowering the drills or hoes consist of rods 41, secured by pins 42 to socket pieces or clips 43, pivoted at 44 to the drag-bars, said rods being curved slightly, having the pins 45 at their upper ends and passing through sleeves 46, loosely pivoted between the bifurcated ends of the levers 47, mounted upon and turning with the angular shaft 48, supported in brackets 18 and 50 above the main frame of the machine.

The outer ends of the shaft 48 are mounted in thimbles $50^\times$ in the bearings 50, said thimbles having angular recesses to fit the ends of the shaft and having flanges to prevent longitudinal movement through the bearings 50, as shown in Fig. 13, and intermediate the ends of the shaft are the bearing-brackets 18, bolted, as described, to the cross-bar 15, the sleeves 51 in these brackets having the angular apertures to fit the shaft, the cylindrical exteriors fitting in the bearings, and the flanges 52 at one end each provided with a notch 53. The brackets are provided upon one side with fingers 54, extending over the edges of the flanges on the sleeves, said sleeves being prevented from longitudinal movement on the shaft by first bringing the slots in line with the fingers, moving them close to the bracket, and then rotating them until the slots are out of line with the fingers, the ordinary rotary movements of the shaft in use not bringing the slots and fingers into juxtaposition again. This arrangement obviates the necessity of fitting the shaft for round bearings by turning or cutting it and materially cheapens the cost of the machine.

55 indicates an arm mounted on the shaft 48 and connected by a link 56 with an operating-lever 57, pivoted at 58 to a segmental bracket 59, secured to the seedbox, said bracket having the recesses 60 on its edge, with which coöperates a spring-operated locking-bolt 61. The operating-lever may be operated by a handle formed integral with the lever, if desired; but I prefer to form the handle 62 of a separate piece pivoted to the lever at 63, with its forward end working in a slot formed in the lever and secured, when the handle is extended, by a spring-catch 64, as shown in Figs. 11 and 12. The lower side of the catch is beveled, as shown in Fig. 12, so that when the handle is folded up against the seedbox, as in Figs. 1 and 11 in dotted lines, it may be moved down to the operative position, (shown in full lines,) and it will engage the beveled side of the catch, throw the latter back, and become rigid with the lever when the catch springs beneath it. Mounted upon the gripping portions of the handle is an ordinary bolt-operating handle or grip-lever 65, (see dotted lines in Fig. 1,) the link 66 connected thereto being pivotally connected with the locking-bolt 61 in line with the pivot 63, so as to permit the folding of the handle without changing the position of the bolt. When not in use, the handle may be folded up, as in dotted lines, Fig. 1, against the seedbox out of the way, and when moved down and locked the hoes may be raised or lowered, as desired. When the hoes are raised, the sleeve 46 engages the pins 45 in the links 41, and when the hoes are to be lowered they are permitted to move down far enough to strike the ground by lowering the arms 47, and for the purpose of forcing them yieldingly into the ground when desired and also to allow them to yield vertically I provide upon each of the links 41 a spring 99, arranged between the sleeve 46 and a pin 67 on the link, so that when the arms 47 are moved down said springs will be compressed, the sleeves 46 sliding down on said links, as will be understood.

The means for feeding the fertilizer and seed from the boxes 70 and 80, respectively, into the hoes or drills may be of any suitable description, 90 indicating a feed-shaft driven from the main axle by suitable speed-gearing, (indicated by 100,) the ordinary feed tubes or conductors 70× being provided for conducting the material, as usual.

For the purpose of assisting in raising and depressing the hoes I provide an arm 77 upon the rock-shaft 48, to the end of which is pivoted a rod 78, extending through an aperture 98 in the front bar of the main frame, and upon said rod is an adjustable abutment in the form of a nut 79, between which and the main frame is arranged a spring 81, as shown in Figs. 1 and 2. When the shaft 48 is rocked to elevate the hoes, the arm 77 is pressed by the spring below the center of motion, and when rocked to depress the hoes the spring is compressed by the nut 79 until the arm 77 passes the center, and then the spring assists in rocking the shaft 48 to move the arms 47 downward, as will be readily understood.

In order to permit grass or other seed to be fed either into the hoes or between them, I provide a supplemental grass-seed box 72 at the rear and arrange beneath the discharge-orifices thereof bifurcated clips or holding-plates 73, with which coöperate spouts or conductors 74, having flanges 75 at their upper ends and arranged at an angle to the plane of said spouts, as shown in Figs. 1, 9, and 10, so that the spouts may be turned to discharge into adjacent hoes or upon the ground between them. The spouts 74 are shown in dotted lines only in Fig. 3 to prevent confusion of the parts, but are shown in full lines in Figs. 9 and 10. Any feeding mechanism of the usual or preferred construction may be used for delivering the seed into these spouts, as will be understood.

The main frame of the machine, constructed as shown, is light, rigid, and does not require special machine-work, the connecting devices being for the most part castings, and also the supports and bearings for the angular shafts are plain castings and do not require machine-work, while the machine as a whole is simple, easily put together, and as I have found from practical use is effective in operation.

The manner of supporting the angular shafts and of connecting the sleeves and thimbles thereto and the detachable connection between the shafts and clips 34, while particularly adapted for a grain-drill, may be used in other machines, as will be understood.

The brackets 19× may be of any suitable construction; but I prefer to form them of cast metal, as shown, with the foot 91, which engages the under side of one of the corner-connecting plates and is secured by the same bolts that fasten the parts together, and they are steadied by the arm 92 engaging the outer side of the main frame, all as shown in Fig. 14.

I claim as my invention—

1. In an agricultural implement, the frame composed of metal bars having the central web, and the angular corner-connecting plates bolted to the webs of the bars and having the flanges 14 engaging the edges of the bars.

2. In an agricultural implement, the frame composed of the metal bars having the central web, and the angular corner-connecting plates bolted to the webs of the bars, having the flanges 14 engaging the edges of the bars and the filling-blocks at the corners.

3. In an agricultural implement, the combination with the frame, of the channeled cross-bar, the wood filling-strip arranged in the channel, and a bracket resting on the bar and secured by bolts passing through the bar and filling-strip and engaging the latter.

4. In an agricultural implement, the combination with the frame and the angular rock-shafts, of the intermeshing gears on the shafts having the sleeves fitting the shafts, the bearings for the sleeves, and means for preventing longitudinal movement of the sleeves in the bearings.

5. In an agricultural implement, the combination with the main frame, and the angular rock-shafts, the intermeshing gears provided with sleeves fitting on the shaft, and the two-part bearings for said sleeves one of said parts having fingers engaging the gears to prevent longitudinal movement.

6. In an agricultural implement, the combination with an angular operating-shaft, a sleeve fitting on said shaft and having a cylindrical exterior, of a bearing for said sleeve, and means for preventing its longitudinal movement relative the bearing.

7. In an agricultural implement, the combination with the main frame, the depending brackets having bearings at the ends, the rock-shafts operating in the bearings and connected for simultaneous operation, of the central bearing for said shafts, and the depending perforated clevis-bracket connected to the main frame and also to the central shaft-bearing.

8. The combination with the hoe, of the rock-shaft arranged above it, the arm 47, the sleeve 46 pivoted thereto, the link having the curved upper end, and the stops 45 and 67 thereon, and the spring 99 arranged between the stop 67 and the sleeve 46.

9. The combination with the series of hoes, of the rock-shaft arranged above the hoes, a series of arms on said shaft, the sleeves 46 pivoted to the arms, the links pivoted to the hoes having the curved upper portions, and the stops 45 and 67 thereon, the springs 99 on the links arranged between the stops 67 and the sleeves 46.

10. In an agricultural implement, the combination with an angular shaft, such as 20, of a clip adapted to be secured thereto, embodying the integral arms having the two seats or surfaces for the flat sides of the shaft, the space between the arms being about equal to the diameter of the shaft and the bolt connecting said arms.

11. In an agricultural implement, the combination with an angular shaft, such as 20, of a clip adapted to be secured thereto, embodying the integral arms having the two seats or surfaces arranged at an angle to each other and to the opening between the arms, said opening being about equal to the diameter of the shaft and the bolt connecting said arms.

12. In a seeding-machine, the combination with the angular rock-shaft 20, of the hoes, the drag-bars therefor, and the clips 34 connected to the hoes and having the integral arms provided with two angular seats between them for the shaft 20, the space between the ends of the arms being about equal to the shorter diameter of the shaft and the bolt connecting said arms.

13. In an agricultural implement, the combination with the angular rock-shaft, the sleeve fitting the shaft and having the cylindrical exterior, and the flange at one end provided with the notch, of the cylindrical bearing for the sleeve having the finger adapted to pass through the notch and engage the flange as the latter is inserted and rotated.

14. In a seeding-machine, the combination with the main frame, the hoes, an angular rock-shaft and connections between it and the hoes for raising and lowering the latter, of the bearing-sleeves fitting the shaft and having cylindrical exteriors and bearings for said sleeves.

15. The combination with the main frame, the seedbox, the hoes, and the rock-shaft connected to the latter, of the lever 57, pivoted beneath the seedbox, the link connecting the lever with the rock-shaft, the operating-handle pivoted to the lever in rear of the seedbox and arranged to be folded up against the latter, and means for securing the handle when extended.

16. The combination with the main frame, the seedbox, the hoes, and the rock-shaft connected to the latter, of the bracket 59 secured to the seedbox having the teeth, the lever pivoted on the bracket, and the link connecting it with the rock-shaft, the operating-handle pivoted to the lever and arranged to fold up against the seedbox, and means for securing the latter when extended.

17. In an agricultural implement, the combination with an operating-lever, of an operating-handle pivoted thereto, and a catch for holding said handle extended or permitting it to fold, substantially as described.

18. In an agricultural implement, the combination with an operating-lever, a locking-bolt thereon, of an operating-handle pivoted on the lever, a bolt-operating grip-lever on the handle, and a pivotal connection between said grip-lever and the bolt, and a catch for locking the handle and lever when extended.

19. The combination with the pivoted operating-lever 57 having the spring-operated bolt 61, and the catch 64 having the beveled face, of the handle 62 pivoted on the lever and adapted to fold at an angle thereto, and means on said handle for operating the bolt 61.

20. In a seeding-machine, the combination with a seedbox having an aperture in its bottom, the spout-holding plate 73 having the fingers 75 arranged at the sides of the aperture, and the rotarily adjustable spout having the circular flange at its upper end with its upper side in contact with the hopper-bottom, and the lower sides of said flange engaged by the fingers on the plate 73.

21. In an agricultural machine, the combination with an angular shaft, of the thimbles at the ends having angular recesses to coöperate with the shaft, smooth exteriors, and the flanges, a bearing-sleeve for the shaft intermediate the ends thereof, and having the angular recess and smooth exterior, and bearings for said sleeves and thimbles.

22. In an agricultural machine, the combination with an angular shaft, of the thimble at the end having the angular recess for the shaft and the smooth exterior, a bearing for said thimble, and means for preventing the relative longitudinal movement of the shaft and thimble.

23. In an agricultural machine, the combination with the main frame, the tubular bearing-sleeve having the cylindrical exterior and arranged at an angle to the horizontal, of the horizontal axle, the dished wheel thereon having the hub with a cylindrical aperture, the rollers in the hub, and connections between the axle and wheel.

ERNEST BASEMAN.

Witnesses:
F. F. CHURCH,
G. A. RODA.